United States Patent Office 3,280,205
Patented Oct. 18, 1966

3,280,205
PROCESS FOR SYNTHESIZING
CYCLODODECATRIENE-(1,5,9)
Tosikatu Yosida and Sadao Yuguchi, both of Ohtsu-shi, Japan, assignors to Toyo Rayon Kabushiki Kaisha, Tokyo, Japan, a corporation of Japan
No Drawing. Filed Oct. 5, 1964, Ser. No. 401,725
Claims priority, application Japan, Oct. 8, 1963, 38/52,536; Nov. 26, 1963, 38/63,054; Dec. 24, 1963, 38/69,228; Mar. 2, 1964, 39/11,350; Apr. 27, 1964, 39/23,560
4 Claims. (Cl. 260—666)

The present invention relates to a process for obtaining cyclododecatriene-(1,5,9), a cyclic trimer, by 1.4 polymerization of butadiene. Cyclododecatriene-(1,5,9) is useful as a starting material in synthesizing compounds of dodecanedicarboxylic acid or lactam which are used as monomers in the manufacture of polymers such as polyesters or polyamides.

Some studies have already been conducted on methods for obtaining, by 1.4 polymerization of butadiene, its cyclic trimer or cyclododecatriene-(1,5,9). Among those studies are, for example, a method which involves the use of a catalyst consisting of titanium halides such as titanium tetrachloride and titanium trichloride blended with alkyl aluminum halides such as diethyl aluminum chloride and also a method previously proposed by the present inventors which employs a mixed catalyst consisting of titanium amide compounds indicated by the formula of $$Ti(NR_2)_nCl_{4-n}$$

Where, $n$ = an integer of 1–4
$R$ = alkyl or aryl group and dialkyl aluminum chloride.

However, the aforementioned catalytic components including titanium tetrachloride generally had a tendency to be deactivated when exposed to water or air. Consequently, their handling required strict care. Moreover, these catalysts had the disadvantage that substantial quantities of low molecular polybutadiene were developed as a by-product in the manufacture of cyclododecatriene.

The object of the present invention is to provide those compounds of such catalytic components which are stable and easy to handle. Another object of the present invention is to provide a catalytic system which yields cyclododecatriene through cyclic polymerization of butadiene with a good "selectivity" and provides easy operation, and also to introduce a process for manufacturing cyclododecatriene by the use of said catalytic system.

As used in the present invention, the term "selectivity" means the ratio of cyclododecatriene-(1,5,9) produced to the amount of butadiene reacted, as expressed in weight percent.

The process of the present invention for synthesizing cyclododecatriene by cyclic polymerization of butadiene is characterized by using as the catalytic system a mixture of (a) At least one titanium compound selected from the group consisting of
(i) Mono-acetylacetonato-titanium trichloride indicated by the formula $Ti(C_5H_7O_2)Cl_3$
(ii) Bis-acetylacetonato-titanium dichloride indicated by the formula of $Ti(C_5H_7O_2)_2Cl_2$
(iii) Tri-acetylacetonato-titanium indicated by the formula of $Ti(C_5H_7O_2)_3$
(iv) Bis-acetylacetonato-titanium oxide indicated by the formula of $[TiO(C_5H_7O_2)_2]_2$
(v) Dialkoxy-titanium bisacetylacetonate indicated by the formula of $(RO)_2Ti(C_5H_7O_2)_2$
where R is a monovalent hydrocarbon group of the class consisting of alkyl groups and aryl groups each containing 1–12 carbon atoms
(vi) and titanium benzoate indicated by the formula $TiCl_n(C_6H_5COO)_{4-n}$
where $n$ is 0 or 2.

(b) At least one organic aluminum compound indicated by the formula of $R'_mAlCl_{3-m}$
where $R'$ is a monovalent hydrocarbon group of the class consisting of an alkyl group and an aryl group, and $m$ is the number from 1 to 2.

The titanium compounds which are used as the aforesaid first catalytic component in the process of the present invention can be synthesized by the following processes:

For mono-acetylacetonate-titanium trichloride, see D. M. Pun' et al., J. Less-Common Metals 4 481 (1962).

For bis-acetylacetonato-titanium dichloride, see "Inorg. Synth." Vol II 119 (1946).

For tri-s-acetylacetonato-titanium, see "Naturwissenschaften," 45, 286 (1958). B. N. Chakravarti.

For bis-acetylacetonato-titanium oxide and dialkoxy titanium bis-acetylacetonate, see J. Am. Chem. Soc., 79 4344 (1957). A. Yamamoto and S Kambara.

Titanium benzoate can be synthesized by various methods including the method (see S. Prasad et al., J. Indian Chem. Soc., 39 (1962)) for synthesizing the same directly from titanium tetrabromide and benzoic acid and the method discovered by the inventors for synthesizing the same from titanium tetrachloride and sodium benzoate. However, titanium benzoate prepared by any synthetic method may be available for the process of the present invention.

The titanium compounds including $TiCl_4$ which have previously been used have the disadvantage that they are unstable to air, particularly to water and, immediately upon exposure thereto, are hydrolyzed and lose catalytic activity. In contrast, the aforementioned titanium compounds used in the process of the present invention remain considerably stable in air. Even while they are subjected, for example, to such operation as weighing in air, their catalytic activity is not lost. Consequently, they are characteristically very easy to handle.

The organic aluminum compound used as the second component of the catalyst is a compound represented by the general formula $$R'_mAlCl_{3-m}$$

where $R'$ is a monovalent hydrocarbon group of the class consisting of an alkyl group and an aryl group and $m$ is the number from 1 to 2. Examples of such compounds are those represented by the formula $R_2'AlCl$, such as dimethyl aluminum chloride, diethyl aluminum chloride, dipropyl aluminum chloride, diisobutyl aluminum chloride and diphenyl aluminum chloride; those represented by the formula $R'AlCl_2$, such as methyl aluminum dichloride, ethyl aluminum dichloride, (n-butyl) aluminum dichloride and (n-propyl) aluminum dichloride; and those represented by the formula $R_3'Al_2Cl_3$, such as ethyl aluminum sesquichloride, (isopropyl) aluminum, sesquichloride, (n-butyl) aluminum sesquichloride and phenyl aluminum sesquichloride. These compounds need not be entirely pure, but may contain other organic aluminum compounds indicated by another general formula such as $AlR_3$ (where R represents the alkyl and phenyl groups). Furthermore, it is also possible to use admixtures of both types of aluminum compounds.

The proportions of the two catalytic components should be such that organic aluminum compounds range from 1 to 100 mol, preferably from 1 to 30 mol per mol of the titanium compounds.

Another feature of the catalytic system of the present invention is that it is soluble in aromatic hydrocarbons including benzene. As it is possible to cyclically polymerize butadiene in a homogeneous system the by-production of solid polybutadiene and oily low molecule polybutadiene is reduced and thus cyclododecatriene-(1,5,9) can be synthesized at a good selectivity.

While hydrocarbon solvents are generally used in the process of the present invention, particularly preferable solvents are aromatic hydrocarbons such as benzene, toluene, xylene, ethyl benzene and tetrahydronaphthalene and other hydrocarbons including cyclododecatriene.

Suitable polymerization conditions for the process of the present invention are reaction temperatures of 0 to 150° C., preferably 10 to 100° C. and pressures of 0 to 15 kg./cm.$^2$ (gauge).

With respect to treatment of the reaction products, the previously used catalytic system is deactivated with methanol and water washed and distilled after inorganics have been removed with hydrochloric or other acid. However, the catalytic system of the present invention is deactivated with extremely small amounts of methanol. After allowed to stand for several hours, the deactivated catalyst precipitates and is separated from a colorless clear solution phase of cyclododecatriene-(1,5,9) hydrocarbons. After decantered out, said hydrocarbon solution is concentrated at reduced pressure. Upon distillation, cyclododecatriene-(1,5,9) is easily removed.

The process of the present invention will be more clearly understood with reference to the examples which follow. Unless specifically stated, the percent as used in the examples represents the weight percent. It should also be noted that the present invention is not limited to said examples.

*Example 1*

250 cc. of anhydrous benzene were charged into a 1 l. four-mouthed flask provided with a condenser, stirrer and butadiene duct. In nitrogen gas streams, 0.45 g. (1.43 millimoles) of $Ti(C_5H_7O_2)_2Cl_2$ and 15.9 millimoles of $Al(C_2H_5)_2Cl$ were added to prepare a catalytic system. While the flask was cooled from the outside with iced water to keep the reaction temperature at 40 to 45° C., butadiene gas was introduced at atmospheric pressure for 5 hours. Upon completion of reaction, 20 cc. of methyl alcohol were added to deactivate the catalyst. A colorless clear benzene solution was decantered out to remove the inorganics which precipitated after 10-hour standing of the deactivated catalyst. The oily material obtained by concentrating said solution at reduced pressure was distilled similarly at reduced pressure. Then 388 g. of cyclododecatriene (hereinafter referred to as "C.D.T.") were obtained as a distillate having a boiling point of 93 to 96° C./11 mm. Hg. The production of C.D.T. was confirmed by the boiling point, infrared-ray spectrum and gas chromatography. More than 99% of C.D.T. obtained were composed of trans-trans-cis isomers.

*Example 2*

Such a type of reactor as stated in Example 1 was charged with 250 cc. of anhydrous benzene. In nitrogen gas streams, 0.45 g. (1.43 millimoles) of $Ti(C_5H_7O_2)_2Cl_2$ and 23.85 millimoles of $Al(C_2H_5)_2Cl$ were added to prepare a catalyst. Butadiene gas was introduced at atmospheric pressure and temperatures of 45 to 50° C. for 6 hours. Upon completion of reaction, treatment of the product was conducted in accordance with the procedure used in Example 1. Some 552 g. of C.D.T. were obtained as a distillate having a boiling point of 92 to 96° C./11 mm. Hg.

*Example 3*

As practiced in Example 1, 250 cc. of anhydrous benzene were mixed with 0.45 g. (1.43 millimoles) of $Ti(C_5H_7O_2)_2Cl_2$ and 31.80 millimoles of $Al(C_2H_5)_2Cl$ to prepare a catalyst. While the reaction temperature was maintained at 40 to 50° C., butadiene was introduced into said reaction system at atmospheric pressure for 5 hours. Upon completion of reaction, the product was treated in the same way as used in Example 1. Some 400 g. of C.D.T. were obtained as a distillate having a boiling point of 90° C./9 mm. Hg.

*Example 4*

A 500 cc. stirrer-type pressure vessel was charged with 200 cc. of benzene, and then with 0.45 g. (1.43 millimoles) of $Ti(C_5H_7O_2)_2Cl_2$ and 23.82 millimoles of $Al(C_2H_5)_2Cl$ to prepare a catalyst. Some 130 g. of liquefied butadiene were added to said catalyst, and reaction was carried out at room temperature for 2 hours. Upon completion of reaction, the same treatment of Example 1 was conducted. Some 92.4 g. of C.D.T. were obtained as a distillate having a boiling point of 60 to 65° C./3 mm. Hg, the yield being 71.1%.

*Example 5*

The same type of reactor as used in Example 4 was charged with 200 cc. of benzene and then with 0.45 g. (1.43 millimoles) of $Ti(C_5H_7O_2)_2Cl_2$ and 31.7 millimoles of $Al(C_2H_5)_2Cl$ to prepare a catalyst. Some 130 g. of liquefied butadiene were introduced into said catalytic system, and reaction was conducted for 2 hours. The reaction product was treated in the same manner as in Example 1. Here, 76 g. of C.D.T. were obtained as a distillate having a boiling point of 88 to 90° C./10 mm. Hg, the yield being 58.5%.

*Example 6*

The same reactor as used in Example 4 was charged with 200 cc. of benzene and then with 0.45 g. (1.43 millimoles) of $Ti(C_5H_7O_2)_2Cl_2$ and 39.70 millimoles of $Al(C_2H_5)_2Cl$ to prepare a catalyst. Some 130 g. of liquefied butadiene were introduced into said catalytic system, and reaction was continued for 2 hours. Upon the same treatment of Example 1, 70.9 g. of C.D.T. were obtained as a distillate having a boiling point of 93 to 95° C./11 mm. Hg, the yield being 54.6%.

*Example 7*

A 500 cc. four-mouthed flask was charged with 200 cc. of benzene and then with 0.8 millimole of $Ti(C_5H_7O_2)_3$ and 1 cc. of $Al(C_2H_5)_2Cl$ to prepare a catalyst. Butadiene was conducted into said catalytic system at atmospheric pressure and reaction was carried out at 50° C. for 3 hours. Upon completion of reaction, the catalyst was deactivated with small amounts of methyl alcohol. Upon distillation of the product at reduced pressure, 119.4 g. of C.D.T. were obtained.

*Example 8*

A catalytic system was prepared from 0.8 millimole of $Ti(C_5H_7O_2)_3$ and 1.5 cc. of $Al(C_2H_5)_2Cl$ in accordance with the process of Example 7. Butadiene was introduced into said catalytic system at 50° C. and atmospheric pressure for 3 hours. Some 116 g. of C.D.T. were obtained in a selectivity of 92%. C.D.T. thus obtained was a mixture of 92.4% of trans-trans-trans isomers and 6.3% of trans-trans-cis isomers.

*Example 9*

A catalytic system was prepared from 0.8 millimole of $Ti(C_5H_7O_2)_3$ and 2 cc. of $Al(C_2H_5)_2Cl$ pursuant to the process of Example 7. Butadiene was introduced into said catalytic system at 50° C. and atmospheric pressure for 3 hours. Here 89.3 g. of C.D.T. were obtained in a selectivity of 89.3%. C.D.T. thus produced was a mixture of 93.3% of trans-trans-trans isomers and 5.8% of trans-trans-cis isomers, containing 0.9% of cyclooctadiene (hereinafter referred to as "C.O.D.").

*Example 10*

A catalytic system was prepared from 0.8 millimole of $Ti(C_5H_7O_2)_3$ and 3 cc. of $Al(C_2H_5)_2Cl$ in accordance with the process of Example 7. Butadiene was conducted into said catalytic system at 50° C. and atmospheric pressure for 3 hours. Here 64.3 g. of C.D.T. were obtained in a selectivity of 86.3%. C.D.T. thus produced was a mixture of 96.5% of trans-trans-trans isomers and 2.7% of trans-trans-cis isomers, including 0.8% of C.O.D.

*Example 11*

A catalytic system was prepared from 1 millimole of $Ti(C_5H_7O_2)_3$ and 2 cc. of $Al(C_2H_5)_2Cl$ in the same manner as practiced in Example 7. Butadiene was introduced into said catalytic system at 20° C. and atmospheric pressure for 3 hours. Some 25.4 g. of C.D.T. were obtained in a selectivity of 86.1%.

*Example 12*

A catalytic system was prepared from 1 millimole of $Ti(C_5H_7O_2)_3$ and 2 cc. of $Al(C_2H_5)_2Cl$ in the same manner as used in Example 7. Butadiene was conducted into said catalytic system at 70° C. and atmospheric pressure for 3 hours. Here 25.9 g. of C.D.T. were obtained in a selectivity of 80.5%.

*Example 13*

A catalytic system was prepared from 1 millimole of $Ti(C_5H_7O_2)_3$ and 2 cc. of $AlEt_2Cl$ by the same process of Example 7. Butadiene was introduced into said catalytic system at 40° C. and atmospheric pressure for 3 hours. Some 129.2 g. of C.D.T. were obtained in a selectivity of 92.3%.

*Example 14*

A 200 cc. stirrer-type pressure vessel was charged with 80 cc. of benzene containing 0.26 g. (0.5 millimole) of $[Ti(C_5H_7O_2)_2O]_2$ and 2 cc. of $Al(C_2H_5)_2Cl$ and then with 39 g. of butadiene. The mass was stirred at room temperature for 1.5 hours. Upon completion of reaction, the catalyst was deactivated with small amounts of methyl alcohol. After extraction, the ether solution was water washed and then dehydrated with $Na_2SO_4$. When oily material remaining after concentration of said ether solution was distilled at reduced pressure 25.42 g. of a distillate were obtained which had a boiling point of 90 to 93° C./10 mm. Hg, the yield being 65.2%. Said product was confirmed to be C.D.T. from the infrared-ray spectrum and gas chromatography.

*Example 15*

A 1 l. three-mouthed flask provided with a stirrer, condenser, gas duct and thermometer was charged with 250 cc. of anhydrous benzene and then with 0.5 millimole of $[TiO(C_5H_7O_2)_2]_2$ and 2 cc. of $Al(C_2H_5)_2Cl$ to prepare a catalyst. Butadiene gas was charged into said catalytic system at room temperature. Reaction was carried out at temperatures of 40 to 60° C. for 4.5 hours. Upon completion of reaction, the product was treated in the same way as in Example 14, and distilled at reduced pressure. Some 185 g. of C.D.T. were obtained as a distillate having a boiling point of 93 to 95° C./11 mm. Hg. Some 17.1 g. of distillation residue were also obtained which was considered low molecule polybutadiene. The selectivity of C.D.T. was 91.5%.

*Example 16*

The same type of reactor as used in Example 15 was charged with 250 cc. of benzene containing 0.5 millimole of $[TiO(C_5H_7O_2)_2]_2$ and 3 cc. of $Al(C_2H_5)_2Cl$ to prepare a catalyst. Butadiene gas was introduced into said catalytic system at atmospheric pressure for 6 hours while the reaction temperature was kept to 40 to 50° C. Upon completion of reaction, the product was treated in accordance with the process of Example 14, and distilled at reduced pressure. Here 193 g. of C.D.T. were obtained as a distillate having a boiling point of 97 to 100° C./11.5 mm. Hg in a selectivity of 89.3%, and 23.1 g. of low molecule polybutadiene were also obtained as by-product.

*Example 17*

The reactor of Example 15 was charged with 250 cc. of benzene containing 0.5 millimole of $[TiO(C_5H_7O_2)_2]_2$ and 4 cc. of $Al(C_2H_5)_2Cl$ to prepare a catalyst. Butadiene gas was introduced into said catalytic system at atmospheric pressure for 6 hours while the reaction temperature was kept at 40 to 50° C. Upon completion of reaction, the product was treated in the same manner as used in Example 14 and distilled at reduced pressure. Some 175 g. of C.D.T. were obtained as a distillate having a boiling point 99 to 105° C., 11 mm. Hg in a selectivity of 89.7. The by-product of low molecule polybutadiene weighed 20.1 g.

*Example 18*

(1) Synthesis of titanium benzoate $Ti(C_6H_5COO)_4$ was synthesized from $TiCl_4$ and benzoic acid.

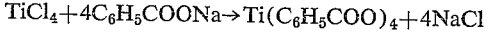
$TiCl_4 + 4C_6H_5COONa \rightarrow Ti(C_6H_5COO)_4 + 4NaCl$

A 300 cc. three-necked flask was charged with 40 cc. of anhydrous ethyl alcohol and 2.3 g. (0.1 g. atom) of sodium to prepare $NaOC_2H_5$. After removal of ethyl alcohol at reduced pressure, 150 cc. of benzene were added to the powders of $NaOC_2H_5$ which crystallized out. A benzene solution of 12.2 g. (0.1 mole) of benzoic acid was dripped at room temperature. After said dropping, reaction was completed by 1-hour reflux. The aforementioned sodium benzoate-benzene was cooled to 5° C. and a benzene solution of 2.75 cc. (0.025 mole) of $TiCl_4$ was dropped at 5 to 7° C. After said dropping, reaction was conducted by reflux for 1 hour. The reaction product was filtered to remove crystallized NaCl. When the filtrate was concentrated at reduced pressure a powdery substance was obtained. The Beilstein test on said powder showed negative results. Therefore it was clear that the chlorine atoms of $TiCl_4$ had been completely substituted by the anions of benzoic acid. This material had a melting point of 110 to 115° C. Considering that literature gave a value of 115° C. for said melting point, it was confirmed that $Ti(C_6H_5COO)_4$ had been produced.

(2) Synthesis of C.D.T. by

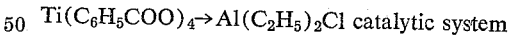
$Ti(C_6H_5COO)_4 \rightarrow Al(C_2H_5)_2Cl$ catalytic system

A 200 cc. stirrer-type pressure vessel was charged with 80 cc. of benzene containing 0.94 millimole of

$Ti(C_6H_5COO)_4$ and 11.9 millimoles of $Al(C_2H_5)_2Cl$ and then with 39 g. of butadiene to prepare a catalyst. Reaction was carried out with stirring at room temperature for 3 hours. Upon completion of reaction, said catalyst was deactivated with small amounts of methyl alcohol. Benzene was distilled out at reduced pressure and the remaining oily substance was distilled similarly at reduced pressure. Then 27.8 g. of distillate were obtained which had a boiling point of 95 to 99° C./14 mm. Hg. Said distillate was confirmed to be C.D.T. from the infrared-ray spectrum and gas chromatographs. The trans-trans-trans isomers contained in C.D.T. produced accounted for 44.9%

*Example 19*

Under the same operating conditions of Example 18, 0.94 millimole of $Ti(C_6H_5COO)_4$ and 19.9 millimoles of $Al(C_2H_5)_2Cl$ were used. Some 20.9 g. of C.D.T. were obtained by 3-hour reaction at room temperature. The content of trans-trans-trans isomers in the product accounted for 42.1%.

Example 20

Under the same operating conditions of Example 18, 0.94 millimole of Ti($C_6H_5$COO)$_4$ and 27.8 millimoles of Al($C_2H_5$)$_2$Cl were used. Here 13.8 g. of C.D.T. were obtained by 3-hour reaction at room temperature. The content of trans-trans-trans isomers in the product was 46.4%.

Example 21

A 500 cc. four-mouthed flask was charged with 200 cc. of benzene and then with 1.27 millimoles of Ti(OBu)$_2$($C_5H_7O_2$)$_2$ and 1 cc. of Al($C_2H_5$)$_2$Cl to prepare a catalyst. Butadiene was introduced into said catalytic system at atmospheric pressure and reaction was conducted at 50° C. for 1.5 hours. Upon completion of reaction, said catalyst was deactivated with small amounts of methyl alcohol. After ether extraction, the deactivated catalyst was washed first with dilute hydrochloric acid, then with water and dehydrated with Na$_2$SO$_4$. Benzene and ether were distilled out and the remaining oily material was distilled. Then 4.47 g. of a distillate were obtained which had a boiling point of 90° C./10 mm. Hg. The gas chromatography and infra-red spectrum analysis showed that said distillate represented a mixture of 92.4% of trans-trans-cis C.D.T. and 7.6% of trans-trans-trans C.D.T. Also 5.72 g. of low molecule polybutadiene were obtained as a distillation residue.

Example 22

The reactor of Example 21 was charged with 200 cc. of benzene containing 1.27 millimoles of Ti(OBu)$_2$($C_5H_7O_2$)$_2$ and 2 cc. of Al($C_2H_5$)$_2$Cl. Butadiene was introduced at atmospheric pressure and reaction was carried out at 50° C. for 1.5 hours. Some 44.12 g. of C.D.T. were obtained as a distillate having a boiling point of 90° C./10 mm. Hg, the selectivity of C.D.T. being 87.4%.

Example 23

The reactor of Example 21 was charged with 200 cc. of benzene containing 1.27 millimoles of Ti(OBu)$_2$($C_5H_7O_2$)$_2$ and 3 cc. of Al($C_2H_5$)$_2$Cl. Butadiene was introduced at atmospheric pressure and reaction was conducted at 50° C. for 1.5 hours. Here 41.46 g. of C.D.T. were obtained as a distillate having a boiling point of 88° C./10mm. Hg, the selectivity of C.D.T. being 83.2%.

Example 24

The reactor of Example 21 was charged with 200 cc. of benzene containing 1.27 millimoles of Ti(OBu)$_2$($C_5H_7O_2$)$_2$ and 4 cc. of Al($C_2H_5$)$_2$Cl. Butadiene was introduced at atmospheric pressure and reaction was conducted at 50° C. for 1.5 hours. Here 51.38 g. of C.D.T. were obtained as a distillate having a boiling point of 88° C./9 mm. Hg, the selectivity of C.D.T. being 82.2%.

Example 25

The reactor of Example 21 was charged with 200 cc. of benzene containing 1.27 millimoles of Ti(OBu)$_2$($C_5H_7O_2$)$_2$ and 5 cc. of Al($C_2H_5$)$_2$Cl. Butadiene was introduced at atmospheric pressure and reaction was carried out at 50° C. for 1.5 hours. Some 42.1 g. of C.D.T. were obtained as a distillate having a boiling point of 87° C./9 mm. Hg, the selectivity of C.D.T. being 81.9%.

Example 26

The reactor of Example 21 was charged with 200 cc. of benzene containing 1.24 millimoles of Ti(OBu)$_2$($C_5H_7O_2$)$_2$ and 4 cc. of Al($C_2H_5$)$_2$Cl. Butadiene was added at atmospheric pressure and reaction was conducted at 30° C. for 1.5 hours. Some 27 g. of C.D.T. were obtained in a selectivity of 74%.

Example 27

The reactor of Example 21 was charged with 200 cc. of benzene containing 1.24 millimoles of Ti(OBu)$_2$($C_5H_7O_2$)$_2$ and 4 cc. of Al($C_2H_5$)$_2$Cl. Butadiene was charged at atmospheric pressure and reaction was conducted at 70° C. for 1.5 hours. Here 7 g. of C.D.T. were obtained in a selectivity of 68%.

Example 28

A 1 l. four-mouthed flask was charged with 200 cc. of benzene containing 1 millimole of Ti($C_5H_7O_2$)$_2$Cl$_2$ and such amounts of Al(i-Bu)$_2$Cl as shown in the following table. With addition of butadiene, reaction was carried out at 50° C. and atmospheric pressure for 3 hours. The results are shown below.

| Al/Ti molar ratio | 10 | 13 | 15 | 20 |
|---|---|---|---|---|
| C.D.T. yield (g.) | 166.3 | 223.1 | 226.6 | 132.6 |
| C.O.D. yield (g.) | 1.0 | 0 | 0.9 | 0.5 |
| Residue (g.) | 22.5 | 20.6 | 21.8 | 19.6 |
| C.D.T. selectivity (percent) | 86.2 | 91.1 | 89.4 | 84.8 |
| C.D.T. yield per g. of Ti compounds (g.) | 523 | 704 | 715 | 418 |

Example 29

(1) Reaction at high pressure:

A 200 cc. pressure vessel was charged with 80 cc. of benzene containing 1 millimole of Ti($C_5H_7O_2$)$_2$(OBu)$_2$ and such amounts of Al(i-Bu)$_2$Cl as shown in the following table and then with 39 g. of liquified butadiene. Reaction was conducted at room temperature for 3.5 hours with pressure raised to 5 kg./cm.$^2$ at the initial reaction. the following results were obtained.

| Al/Ti molar ratio | 10 | 15 | 20 |
|---|---|---|---|
| C.D.T. yield (g.) | 2.3 | 28.4 | 29.6 |
| Residue (g.) | 2.2 | 8.1 | 6.2 |
| C.D.T. selectivity (percent) | 51.5 | 77.8 | 82.7 |
| C.D.T. yield (percent) | 5.9 | 73 | 76 |

(2) Reaction at atmospheric pressure:

A 500 cc. four-mouthed flask was charged with 200 cc. of benzene containing 1 millimole of Ti($C_5H_7O_2$)$_2$(OBu)$_2$ and 20 millimoles of Al(i-Bu)$_2$Cl. With addition of butadiene, reaction was carried out at 40° C. and atmospheric pressure for 3 hours. Here 64.1 g. of C.D.T. were obtained in a selectivity of 68.3%.

Example 30

A 200 cc. pressure vessel was charged with 80 cc. of benzene containing 1 millimole of Ti($C_5H_7O_2$)$_3$ and such amounts of Al(i-Bu)$_2$Cl as shown in the following table and then with 39 g. of liquefied butadiene. Reaction was conducted at room temperature for 3.5 hours. The following results were obtained.

| Al/Ti molar ratio | 10 | 15 | 20 |
|---|---|---|---|
| C.D.T. yield (g.) | 0 | 31.8 | 27.7 |
| Residue (g.) | 4.2 | 7.3 | 7.6 |
| C.D.T. selectivity (percent) | 0 | 81.3 | 78.5 |
| C.D.T. yield (percent) | 0 | 81.3 | 71.0 |

Example 31

A 200 cc. pressure vessel was charged with 80 cc. of benzene containing 1 millimole of Ti($C_5H_7O_2$)$_2$O and such amounts of Al(i-Bu)$_2$Cl as shown in the following table and then with 39 g. of butadiene. Reaction was conducted at room temperature for 3.5 hours. The following results were obtained.

| Al/Ti molar ratio | 10 | 15 | 20 |
|---|---|---|---|
| C.D.T. yield (g.) | 5.5 | 13.5 | 33.5 |
| Residue (g.) | 3.8 | 4.1 | 5.5 |
| C.D.T. yield (percent) | 14.1 | 34.6 | 86 |
| C.D.T. selectivity (percent) | 59 | 77 | 86 |

*Example 32*

A 500 cc. four-mouthed flask was charged with 200 cc. of benzene containing 1 millimole of $Ti(C_5H_7O_2)_2(OPh)_2$ and such amounts of $AlEt_2Cl$ as shown in the following table. With addition of butadiene, reaction was conducted at 50° C. and atmospheric pressure for 1.5 hours. The following results were obtained.

| Al/Ti molar ratio | 7.95 | 10.33 | 15.89 | 19.86 |
|---|---|---|---|---|
| C.D.T. yield (g.) | 6.5 | 93.9 | 75.5 | 85.9 |
| Residue (g.) | 3.5 | 8.5 | 10.2 | 10.7 |
| C.D.T. selectivity (percent) | 65 | 91.7 | 85.7 | 88.9 |

*Example 33*

(1) Synthesis of dialkoxy-titanium bisacetylacetonate of the formula:

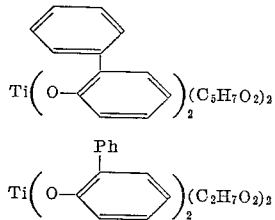

was synthesized in accordance with the following reaction formula

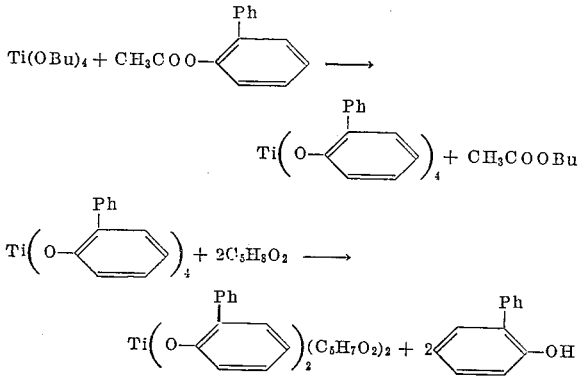

The thus obtained compound is a novel substance and is an orange-colored crystal having a melting point of 125 to 127° C.

(2) Synthesis of C.D.T. in the presence of:

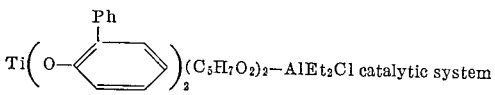

A 500 cc. three-necked flask was charged with 1 millimole of:

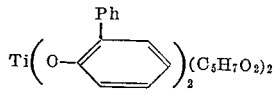

and benzene containing $AlEt_2Cl$ in the amounts specified in the following table. While introducing butadiene thereto, reaction was carried out for 1.5 hours at 25° C. under atmospheric pressure. Results are shown in the following table.

| Molar ratio Al/Ti | 10 | 13 | 15 | 20 | 25 |
|---|---|---|---|---|---|
| C.D.T. yield (g.) | 78.3 | 112.0 | 100.2 | 83.2 | 67.2 |
| Polymer yield (g.) | 15.7 | 13.0 | 12.6 | 12.9 | 14.4 |
| C.D.T. yield (percent) | 83.3 | 89.3 | 88.6 | 86.6 | 82.3 |

*Example 34*

(1) Synthesis of titanium benzoate represented by the formula:

$$TiCl_2(C_6H_5COO)_2$$

$Ti(C_6H_5COO)_4$ and $TiCl_4$ in the proportion of 1 to 1 were reacted in benzene with each other in accordance with the following reaction formula:

$$Ti(C_6H_5COO)_4 + TiCl_4 \rightarrow 2TiCl_2(C_6H_5COO)_2$$

When benzene was condensed at the end of the reaction, the said compound in light brown crystals was obtained.

The reaction product was confirmed by elemental analysis.

|  | C | H |
|---|---|---|
| Found | 46.78 | 3.09 |
| Calculated | 46.57 | 2.79 |

(2) Synthesis of C.D.T. in the presence of $$TiCl_2(C_6H_5COO)_2—AlEt_2Cl$$

catalyst system:

(a) Reaction at high pressure:

One millimole of $TiCl_2(C_6H_5COO)_2$ and 80 cc. of benzene containing 1.5 cc. of $AlEt_2Cl$ were put in a 200 cc. pressure bottle, with subsequent addition of 60 cc. liquid butadiene. Reaction was carried out for 2 hours at room temperature.

Thus, there were obtained 20 g. of C.D.T. having a boiling point of 88–95° C./10 mm. Hg and 13.5 g. of distillation residue (polymer).

(2) Reaction at atmospheric pressure:

A 500 cc. three-necked flask was charged with 1 millimole of $TiCl_2(C_6H_5COO)_2$ and 200 cc. of benzene containing $AlEt_2Cl$ in the amounts specified in the following table, and while introducing butadiene thereto, reaction was carried out at 45–50° C. for 1.5 hours. Results are shown in the following table.

| Molar ratio Al/Ti | 10.2 | 13.4 | 15.7 | 19.6 |
|---|---|---|---|---|
| C.D.T. yield (g.) | 25.5 | 30.2 | 26.0 | 28.9 |
| Polymer yield (g.) | 9.5 | 8.6 | 8.6 | 8.9 |
| C.D.T. selectivity (percent) | 72.5 | 77.8 | 75.2 | 76.3 |
| t,t,t-isomer (percent) | 12.3 | 39.6 | 37.4 | 29.5 |
| t,t,c-isomer (percent) | 87.7 | 60.4 | 62.6 | 70.5 |

*Example 35*

A 1-liter three-necked flask was charged with 200 cc. of benzene containing 0.4 g. of $Ti(C_5H_7O_2)Cl_3$, with subsequent addition of $AlEt_2Cl$ in the amounts specified. While introducing butadiene for 1.5 hours, reaction was carried out at a temperature of 40–45° C. under atmospheric pressure. Results are shown in the following table.

| $AlEt_2Cl$ (cc.) | 1.5 | 2 | 2.5 | 3 |
|---|---|---|---|---|
| C.D.T. yield (g.) | 130.6 | 251.8 | 175.4 | 168.2 |
| Polymer yield (g.) | 12.9 | 22.2 | 27.8 | 25.1 |
| C.D.T. selectivity (percent) | 90.3 | 92.2 | 85.3 | 87.0 |

*Example 36*

A catalytic system was prepared by putting 200 cc. of benzene, 1 millimole of $TiCl_2(C_5H_7O_2)_2$ and 2.5 cc. of $Al_2Et_3Cl_3$ in a 1-liter three-necked flask. While introducing butadiene for 2 hours under atmospheric pressure, reaction was carried out with the temperature maintained at 50° C.

At the end of the reaction, 10 cc. of methanol was added to deactivate the catalyst, and, after benzene was distilled off, the reaction product was distilled to give 560.2 g. of a fraction having a boiling point of 90° C./10 mm. Hg. The distillation residue weighed 55.8 g. and the selectivity of C.D.T. was 90.94%.

*Example 37*

A catalytic system was prepared by putting 150 cc. of benzene, 1 millimole of $TiCl_2(C_5H_7O_2)_2$ and 3 cc. of $Al_2Et_3Cl_3$ in a 500 cc. three-necked flask. While introducing butadiene for 1 hour under atmospheric pressure, reaction was carried out with the temperature maintained at 50° C.

Treatment was effected in the same manner as in Example 36 to give 314.8 g. of C.D.T. and 35.1 g. of distillation residue. The selectivity of C.D.T. was 90.0%.

*Example 38*

A catalytic system was prepared by putting 200 cc. of benzene, 1 millimole of $TiCl_2(_5H_7O_2)_2$ and 3 cc. of $Al_2Et_3Cl_3$ in a 1-liter three-necked flask. While introducing butadiene for two hours under atmospheric pressure, reaction was carried out with the temperature maintained at 50° C.

Treatment was effected in the same manner as in Example 36 to give 604 g. of C.D.T. and 47 g. of distillation residue. The selectivity of C.D.T. was 92.78%.

*Example 39*

A catalytic system was prepared by putting 200 cc. of benzene, 1 millimole of $TiCl_2(C_5H_7O_2)_2$ and 3.5 cc. of $Al_2Et_3Cl_3$ in a 1-liter three-necked flask. While introducing butadiene for 2 hours under atmospheric pressure, reaction was carried out with the temperature maintained at 50° C.

Treatment was effected in the same manner as in Example 36 to give 589.7 g. of C.D.T. and 56.7 g. of distillation residue. The selectivity of C.D.T. was 91.23%.

*Example 40*

A catalytic system was prepared by putting 200 cc. of benzene, 1 millimole of $TiCl_2(C_5H_7O_2)_2$ and 4 cc. of $Al_2Et_3Cl_3$ in a 1-liter three-necked flask. While introducing butadiene for 2 hours under atmospheric pressure, reaction was carried out with the temperature maintained at 50° C.

Treatment was effected in the same manner as in Example 36 to give 486.7 g. of C.D.T. and 50.1 g. of distillation residue. The selectivity of C.D.T. was 90.67%.

Having described the specification, we claim:

1. A process for the preparation of cyclododecatriene-(1,5,9) which comprises introducing 1,3-butadiene into a catalytic composition, said catalytic composition containing
    (a) at least one titanium compound selected from the group consisting of
        (i) mono-acetylacetonate-titanium trichloride indicated by the formula $Ti(C_5H_7O_2)Cl_3$
        (ii) bis-acetylacetonate-titanium dichloride indicated by the formula of $Ti(C_5H_7O_2)_2Cl_2$
        (iii) Dialkoxy-titanium bis-acetylacetonate indicated by the formula of $(RO)_2Ti(C_5H_7O_2)_2$ wherein R is monovalent hydrocarbon group of the class consisting of alkyl group and aryl group each containing 1–12 carbon atoms, and
        (iv) Titanium benzoate indicated by the formula $TiCl_n(C_6H_5COO)_{4-n}$ wherein $n$ is 0 or 2, and
    (b) at least one organic aluminum compound indicated by the formula of $R'_mAlCl_{3-m}$ wherein R' is a monovalent hydrocarbon group of the class consisting of a lower alkyl group and a phenyl group, and $m$ is the number from 1 to 2, in a molar ratio of component (a) and component (b) within the range of 1:1 to 1:100.

2. Process described in claim 1 which comprises adding 1 to 50 mol of said organic aluminum compounds per mol of said titanium compounds.

3. Process described in claim 1 which comprises using as the solvent for the aforesaid catalyst aromatic hydrocarbons selected from the group consisting of benzene, toluene, xylene, ethyl benzene, and tetrahydronaphthalene.

4. Process described in claim 1 which involves the use of cyclododecatriene-(1,5,9) as the solvent for the aforesaid catalyst.

References Cited by the Examiner

UNITED STATES PATENTS

| | | | |
|---|---|---|---|
| 3,147,240 | 9/1964 | Coover et al. | 260—93.7 |
| 3,149,173 | 9/1964 | Wittenberg et al. | 260—666 |

FOREIGN PATENTS

| | | |
|---|---|---|
| 921,954 | 3/1963 | Great Britain. |

DELBERT E. GANTZ, *Primary Examiner.*

V. O'KEEFE, *Assistant Examiner.*